(12) United States Patent
van Bemmel

(10) Patent No.: US 8,014,299 B2
(45) Date of Patent: Sep. 6, 2011

(54) METHOD AND APPARATUS FOR DETECTING FORWARDING LOOPS

(75) Inventor: Jeroen van Bemmel, Leiden (NL)

(73) Assignee: Alcatel Lucent, Paris (FR)

( * ) Notice: Subject to any disclaimer, the term of this patent is extended or adjusted under 35 U.S.C. 154(b) by 877 days.

(21) Appl. No.: 11/423,830

(22) Filed: Jun. 13, 2006

(65) Prior Publication Data

US 2007/0268904 A1 Nov. 22, 2007

Related U.S. Application Data

(60) Provisional application No. 60/802,561, filed on May 22, 2006.

(51) Int. Cl.
*G01R 31/08* (2006.01)
(52) U.S. Cl. ........ 370/242; 370/216; 370/222; 370/241; 370/351; 370/389; 370/392
(58) Field of Classification Search .................. 370/351, 370/392
See application file for complete search history.

(56) References Cited

U.S. PATENT DOCUMENTS

| | | | | |
|---|---|---|---|---|
| 6,501,754 | B1 * | 12/2002 | Ohba et al. ............ | 370/389 |
| 6,804,240 | B1 * | 10/2004 | Shirakawa et al. ...... | 370/392 |
| 6,845,152 | B2 * | 1/2005 | Taff et al. ............. | 379/211.02 |
| 2003/0123432 | A1 | 7/2003 | Cheng et al. | |
| 2005/0030949 | A1 | 2/2005 | Shirakawa et al. | |
| 2005/0111649 | A1 | 5/2005 | Belkin et al. | |
| 2005/0220095 | A1 * | 10/2005 | Narayanan et al. ...... | 370/389 |
| 2006/0013141 | A1 * | 1/2006 | Mutoh et al. .......... | 370/241 |
| 2006/0045091 | A1 | 3/2006 | Hata | |

FOREIGN PATENT DOCUMENTS

| | | |
|---|---|---|
| JP | 5244299 A | 9/1993 |
| JP | 2005006139 A | 1/2005 |
| JP | 2006074286 A | 3/2006 |

OTHER PUBLICATIONS

International Search Report and Written Opinion in corresponding PCT/US2007/011386, Nov. 12, 2007, Lucent Technologies Inc.
http://www1.jetf.org/internet-drafts/draft-ietf-sip-hop-limit-diagnostics-00.txt, "Diagnostic Responses for SIP Hop Limit Errors," S. Lawrence et al, Feb. 24, 2006.
http://www.ietf.org/rfc/rfc3261.txt, "SIP: Session Initiation Protocol," J. Rosenberg et al., Jun. 2002.

* cited by examiner

*Primary Examiner* — Daniel J Ryman
*Assistant Examiner* — Aixa A Guadalupe
(74) *Attorney, Agent, or Firm* — Wall & Tong, LLP

(57) ABSTRACT

The invention includes a method and apparatus for detecting a forwarding loop at a network element. The method includes determining whether a received message was previously received by the first network element, and, if the received message was previously received, calculating a current routing digest and determining whether a header of the received message includes a previous routing digest. If the header of the received message includes the previous routing digest, a determination is made as to whether a forwarding loop exists. If the header of the received message does not include the previous routing digest, the current routing digest is inserted into the header of the received message and the message is forwarded toward the second network element. If the received message was not previously received, forwarding the received message toward a second network element.

20 Claims, 3 Drawing Sheets

100

200

METHOD AND APPARATUS FOR DETECTING FORWARDING LOOPS

CROSS-REFERENCE TO RELATED APPLICATION

This application claims priority of commonly owned U.S. Provisional Patent Application Ser. No. 60/802,561 filed on May 22, 2006, which is incorporated by reference herein in its entirety.

FIELD OF THE INVENTION

The invention relates to the field of communication networks and, more specifically, to detecting forwarding loops.

BACKGROUND OF THE INVENTION

The Session Initiation Protocol (SIP) protocol is an end-to-end client-server signaling protocol for initiating, modifying, and terminating interactive user sessions supporting voice, instant messaging, video, online gaming, and the like. The SIP protocol, which is utilized in next-generation networks such as Internet Protocol (IP) Multimedia Subsystem (IMS) networks, enables communication between distributed elements (e.g., between SIP user agents (UAs)). Using the SIP protocol, SIP messages exchanged between SIP UAs traverse a series of SIP network elements (known as proxies). Unfortunately, due to incorrectly configured network elements or malicious network attacks, a forwarding loop may form such that a SIP message is repeatedly forwarded between SIP network elements, thereby preventing delivery of the SIP message to the intended SIP UA and causing a high message processing load. Since forwarding loops may occur in networks utilizing SIP (as well as networks utilizing other telecommunication protocols), several measures have been implemented to attempt to reduce forwarding loops.

In one potential solution, for example, a client device may add a "max-forwards" header field to the header of a SIP message in order to limit the number of times the SIP message is forwarded before a forwarding loop is detected (i.e., a SIP message may only be forwarded N times (e.g., N=70) before a forwarding loop is detected). Disadvantageously, use of a "max-forwards" header field may cause numerous problems. If the "max-forwards" header field value (N) is set too low, valid service provisioning may be overly restricted. If the "max-forwards" header field value (N) is set too high, significant network resources may be consumed. Furthermore, a forwarding loop error message generated in response to detection of a forwarding loop may be forwarded along the traversed path, thereby resulting in additional consumption of network resources.

SUMMARY OF THE INVENTION

Various deficiencies in the prior art are addressed through the invention of a method and apparatus for detecting a forwarding loop at a network element. The method includes determining whether a received message was previously received by the first network element, and, if the received message was previously received, calculating a current routing digest and determining whether a header of the received message includes a previous routing digest. If the header of the received message includes the previous routing digest, a determination is made as to whether a forwarding loop exists. If the header of the received message does not include the previous routing digest, the current routing digest is inserted into the header of the received message and the message is forwarded toward the second network element. If the received message was not previously received, forwarding the received message toward a second network element.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides forwarding loop detection processing. The present invention enables detection of forwarding loops. The present invention represents a tradeoff between effective detection of forwarding loops and processing costs associated with detection of forwarding loops, thereby providing effective forwarding loop detection capabilities while significantly reducing network element processing resources utilized for performing forwarding loop detection processing. The present invention obviates the need for a network element to perform digest calculations in the absence of a forwarding loop, instead postponing digest calculations and insertion until a potential forwarding loop is detected by the network element (i.e., if the message was previously received and forwarded by the network element).

The forwarding loop detection processing of the present invention provides significant advantages over forwarding loop detection processing of RFC3261. The forwarding loop detection processing of the present invention enables less costly detection of forwarding loops (in terms of CPU processing) as compared with forwarding loop detection processing of RFC3261. In one embodiment, using forwarding loop detection processing of the present invention, a forwarding loop is detected one forwarding step later (e.g., the third time a message is received by the network element) than the forwarding loop would otherwise be detected using forwarding loop detection processing of RFC3261 (e.g., the second time a message is received by the network element). In one embodiment, by utilizing a new header field (rather than reusing a portion of an existing header field, as in RFC3261), forwarding loop detection processing of the present invention may be performed without interfering with other message processing.

Figure 1:
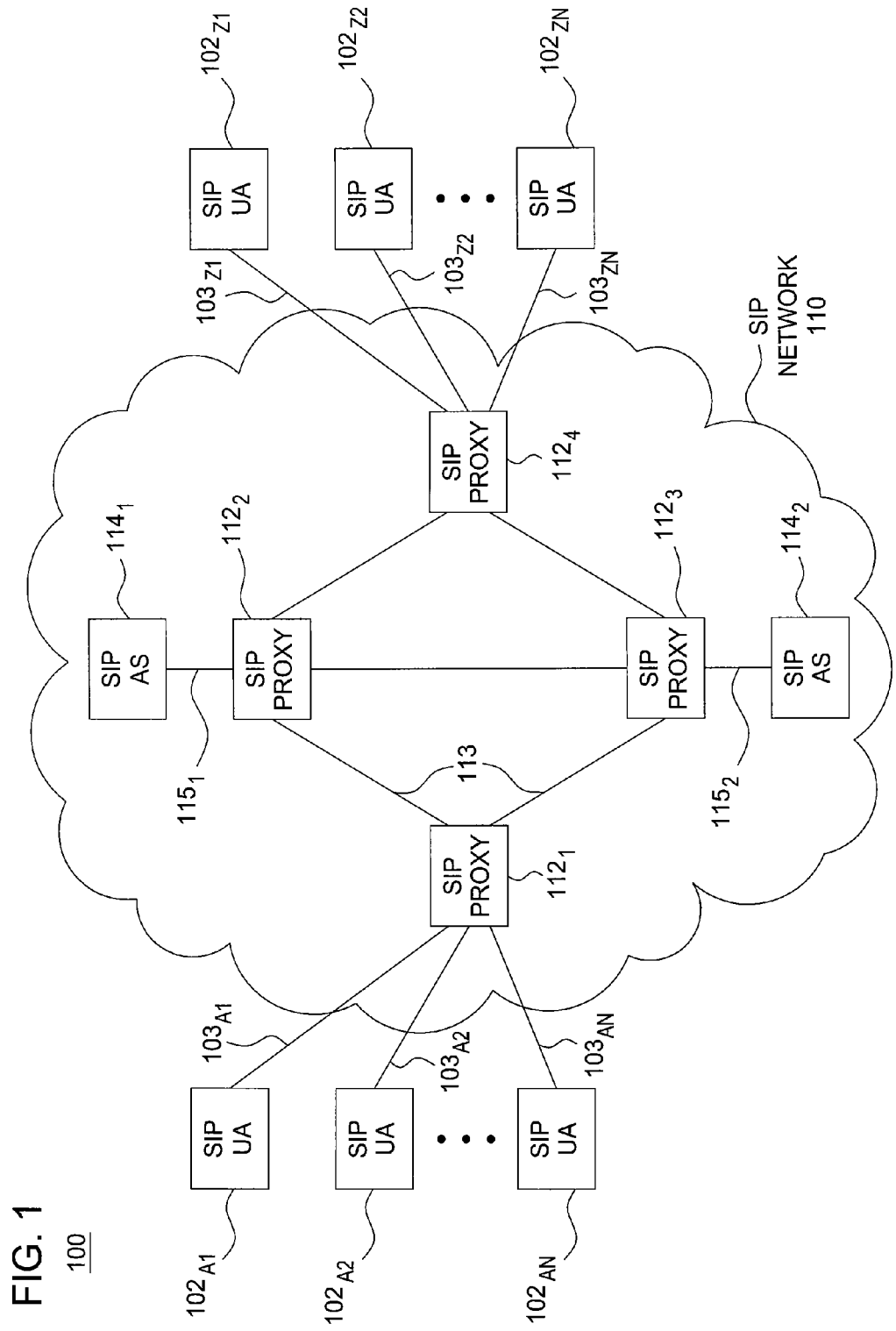
FIG. 1 depicts a high-level block diagram of a communication network.

FIG. 1 depicts a high-level block diagram of a communication network. Specifically, communication network 100 includes a first plurality of SIP user agents (UAs) $102_{A1}$-$102_{AN}$ (collectively, SIP UAs $102_A$), a SIP network 110, and a second plurality of SIP user agents (UAs) $102_{Z1}$-$102_{ZN}$ (collectively, SIP UAs $102_Z$). The SIP UAs $102_A$ and $102_Z$ may be collectively referred to as SIP UAs 102. The SIP network 110 includes a plurality of SIP proxy servers (SIP PSs) $112_1$-$112_4$ (collectively, SIP PSs 112) and a plurality of SIP application servers (ASs) $114_1$-$114_2$ (collectively, SIP ASs 114). The SIP PSs 112 communicate using a plurality of communication links (CLs) 113 (collectively, CLs 113). The SIP PSs $112_2$ and $112_3$ communicate with SIP ASs $114_1$ and $114_2$ using communication links (CLs) $115_1$ and $115_2$ (collectively, CLs 115).

As depicted in FIG. 1, SIP UAs 102 include end-user devices supporting SIP signaling. The SIP UAs 102 may operate as SIP UA clients (for providing SIP requests to SIP UA servers) and SIP UA servers (for providing SIP responses to SIP UA clients). The SIP UAs $102_{A1}$-$102_{AN}$ and SIP UAs $102_{Z1}$-$102_{ZN}$ communicate with SIP PSs $112_1$ and $112_3$ using respective pluralities of communication links (CLs) $103_{A1}$-$103_{AN}$ (collectively, CLs $103_A$), and $103_{Z1}$-$103_{ZN}$ (collectively, CLs $103_Z$), respectively. The SIP UAs 102 may access SIP network 110 using wireline access (e.g., cable access, digital subscriber line (DSL) access, Ethernet access, and the like, as well as various combinations thereof), wireless access (e.g., code division multiple access (CDMA) access, general packet radio service (GPRS) access, wireless local area network (WLAN) access, and the like, as well as various combinations thereof).

As depicted in FIG. 1, SIP PSs 112 facilitate SIP signaling between SIP UAs 102 for establishing, modifying, and terminating multimedia connections between SIP UAs 102. The SIP PSs 112 facilitate SIP signaling with various other SIP-based network elements (illustratively, SIP ASs 114) for supporting various functions associated with SIP signaling between SIP UAs 102 for establishing, modifying, and terminating multimedia connections between SIP UAs 102. For example, SIP PSs 112 support SIP signaling between SIP UAs 102 for establishing, modifying, and terminating multimedia connections adapted for supporting voice, instant messaging, video, gaming, presence, and the like, as well as various combinations thereof. The SIP ASs 114 provide various functions (e.g., call waiting, call forwarding, conference call services, instant messaging services, and the like, as well as various combinations thereof) to SIP UAs 102.

As described herein, SIP signaling is performed using various SIP messages. A SIP message initiated by a SIP UA 102 operating as a SIP UA client is a SIP request. For example, SIP request messages include INVITE, ACK, BYE, CANCEL, OPTIONS, REGISTER, and the like. A SIP message initiated by a SIP UA 102 operating as a SIP UA server is a SIP response. For example, SIP response messages include SIP 1xx informational responses, SIP 2xx successful responses, SIP 3xx directional responses, SIP 4xx client failure responses, SIP 5xx server failure responses, SIP 6xx global failure responses, and the like. The SIP request messages and SIP response messages, as well as other SIP messages adapted for supporting establishment, modification, and termination of SIP sessions may be generally referred to herein as SIP messages.

As described herein, various network conditions (e.g., incorrectly configured SIP proxy server(s), malicious network attacks, and the like) may result in the formation of a forwarding loop within SIP network 110. For example, a SIP INVITE message may be initiated from SIP UA $102_{A2}$ toward SIP UA $102_{Z1}$. The SIP UA $102_{A2}$ forwards the SIP INVITE message to SIP proxy $112_1$. The SIP proxy $112_1$ forwards the message to SIP proxy $112_2$. The SIP proxy $112_2$ forwards the SIP INVITE message to SIP proxy $112_3$, however, due to a network condition (e.g., SIP proxy $112_3$ being incorrectly configured), rather than forwarding the SIP INVITE message to SIP proxy $112_4$ for delivery to SIP UA $102_{Z1}$, SIP proxy $112_3$ may forward the SIP INVITE message back to SIP proxy $112_2$. The SIP proxy $112_2$ re-forwards the SIP INVITE message to SIP proxy $112_3$. As described herein, the present invention (which may be better understood with respect to FIG. 2) enables efficient, cost-effective detection of such forwarding loops.

Figure 2:
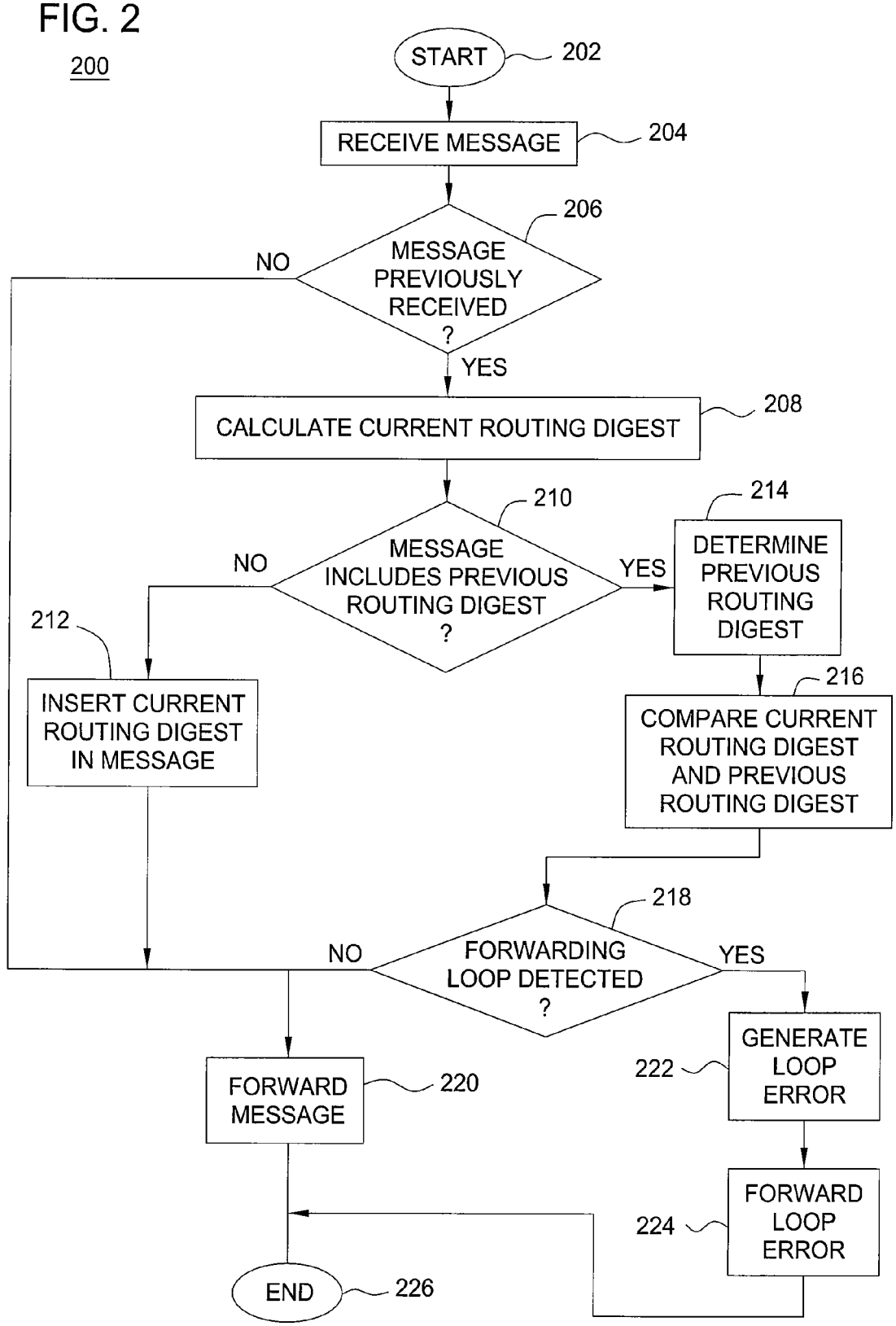
FIG. 2 depicts a method according to one embodiment of the present invention.

FIG. 2 depicts a method according to one embodiment of the present invention. Specifically, method 200 includes a method for detecting a forwarding loop at a network element. Although primarily described herein with respect to processing performed by a SIP proxy server for detecting a forwarding loop associated with a SIP message, method 200 may be performed by other SIP and non-SIP network elements for detecting forwarding loops associated with SIP and non-SIP messages, respectively. Although depicted and described as being performed serially, at least a portion of the steps of method 200 may be performed contemporaneously, or in a different order depicted in FIG. 2. The method 200 begins at step 202 and proceeds to step 204.

At step 204, a SIP message (request) is received at a SIP proxy server. The received SIP message may be any SIP request message (e.g., SIP INVITE, SIP REGISTER, and the like). The SIP message may be received from any SIP network element (e.g., SIP UA (client or server), SIP PS, SIP AS, and the like). At step 206, a determination is made as to whether the received SIP request message was previously received by the SIP proxy server (i.e. whether the received SIP request message previously passed through the SIP proxy). The determination is made as to whether the received SIP request message was previously received by the SIP proxy server may be performed using one of a plurality of methods.

In one embodiment, determining whether the received SIP message was previously received by the SIP proxy server includes determining if a header of the received SIP message includes a header field inserted by the SIP proxy server (i.e., inserted by the SIP proxy server when the received SIP message was previously processed by the SIP proxy server). In one embodiment, the determination as to whether the header of the received SIP message includes a header field previously inserted by the SIP proxy server includes searching one or more header fields of the header of the received SIP message for a header field value which identifies the SIP proxy (e.g., parsing a plurality of SIP VIA header fields included in the header of the received message to identify a SIP VIA header field including the IP address or hostname of the SIP proxy server). An exemplary SIP message including a SIP header having a plurality of SIP VIA header fields and a Session Description Protocol (SDP) body follows:

INVITE sip:UAS@127.0.0.1:5060; transport=UDP SIP/2.0

Via: SIP/2.0/UDP 135.85.65.214:5061; branch=z9hG4bK-1

Via: SIP/2.0/UDP 135.85.65.214:5062; branch=z9hG4bK-2

Record-Route: <sip:135.85.65.214:5061;lr>

Route: <sip:127.0.0.1;lr>

Max-Forwards: 69

CSeq: 1 INVITE

Call-ID: 7a66e93e@135.85.65.214

From: "UAC"<sip:UAC@135.85.65.214>;tag=363e5a34

To: "UAS"<sip:UAS@127.0.0.1:5060; transport=UDP>

Contact: "UAC"<sip:uac_a@127.0.0.1:5062; transport=UDP>

Subject: Performance test

Route: <sip:proxy@127.0.0.1:5061>

Content-Type: application/sdp

Content-Length: 101 v=0 o=–0 0 IN IP4 lucent.com s=-
c=IN IP4 10.20.30.60
t=0 0
m=audio 5004 RTP/AVP 8 3 0

In one embodiment, determining whether the received SIP message was previously received by the SIP proxy server includes determining if one or more of the header fields of the received SIP message includes a header field value inserted by the SIP proxy server (i.e., inserted by the SIP proxy server when the received SIP message was previously received by the SIP proxy server). In one embodiment, the header field includes a SIP VIA header field. In one such embodiment, the determination as to whether one or more header fields of the received SIP message includes a header field value previously inserted by the SIP proxy server includes searching one or more header fields of the header of the received SIP message for a header field value which identifies the SIP proxy (e.g., parsing a plurality of SIP VIA header fields included in the header of the received message to identify a SIP VIA header field including the IP address of the SIP proxy server).

As depicted in FIG. 2, if the received message was not previously received by the SIP proxy server, method 200 proceeds to step 220, at which point the received SIP message is forwarded. The received SIP message is forwarded toward another SIP network element (e.g., SIP PS, SIP AS, SIP UA, and the like). From step 220, method 200 proceeds to step 226, where method 200 ends. As depicted in FIG. 2, if the received SIP message was previously received by the SIP proxy server, method 200 proceeds to step 208. At step 208, a current routing digest (CRD) is calculated.

In one embodiment, a routing digest is calculated by summing up the result of a hash function over one or more of the following headers and message parts: the request Uniform Resource Identifier (URI), the topmost Route header, any or all Require and/or Proxy-Require headers, any or all Authorization and/or Proxy-Authorization headers, the Call-Id header, From and/or To headers (including tag parameter), and the CSeq header, and the like, as well as various combinations thereof. In general, any information on which a proxy server routing decision could be based may be included. By calculating the routing digest, a change in this information is detected. The assumption is that if no part of this information is changed since the previous time the message traversed the proxy, the proxy will make the same routing decision. If all proxies follow this logic, the request will eventually arrive again at the current proxy, thus forming a loop.

At step 210, a determination is made as to whether the received SIP message includes a previous routing digest (PRD). A PRD is a routing digest previously calculated and inserted into the received SIP message by the SIP proxy server. In one embodiment, the determination as to whether the received SIP message includes a PRD includes searching at least one message header field of the received SIP message (e.g., the message header field (e.g., SIP VIA header field) identified as having been previously inserted in the received SIP message by the SIP proxy server). If the received SIP message does not include a PRD (previously calculated and inserted by the SIP proxy server), method 200 proceeds to step 212. If the received SIP message does include a PRD (previously calculated and inserted by the SIP proxy server), method 200 proceeds to step 214.

At step 212, the CRD is inserted into the received SIP message. In one embodiment, the CRD is inserted into the received SIP message using a CRD parameter (denoted herein as a "loop check" (i.e., "lc") parameter). In one embodiment, the CRD is inserted into the header of the received SIP message. In one embodiment, the CRD is inserted as a portion of an existing SIP message header field. In one embodiment, the CRD is inserted as a portion of an existing SIP message header field using a CRD parameter value (e.g., "Via: SIP/2.0/UDP 135.85.65.214:5062; branch=z9hG4bK-2;03abd87f", where the routing digest value is hexadecimal). In one embodiment, the CRD is inserted as a portion of an existing SIP message header field using a CRD parameter name (e.g., "lc") and associated CRD parameter value (e.g., "Via: SIP/2.0/UDP 135.85.65.214:5062;branch=z9hG4bK-2;lc=03abd87f", where the routing digest value is hexadecimal). In one embodiment, the CRD is inserted as a new SIP message header field having a SIP message header field name and associated SIP message header field value (e.g., "Loop-Check: proxy.example.com; lc=012345678").

An exemplary SIP message including an exemplary calculated routing digest (e.g., either PRD or CRD) follows. As depicted in the exemplary SIP message, one of the VIA header fields includes a "loop check" parameter (denoted as "lc"). The "lc" parameter may include the "lc" parameter name (e.g., denoted as "lc") and associated "lc" parameter value). Although described as being identified by an "lc" parameter name, various other parameter names may be utilized to identify routing digests. Although a specific "lc" parameter value is depicted, various other "lc" parameter values (e.g., "lc" parameter values having other formats) may be used for conveying the calculated routing digest.

INVITE sip:UAS@127.0.0.1:5060;transport=UDP SIP/2.0
Via: SIP/2.0/UDP 135.85.65.214:5061; branch=z9hG4bK-1;lc=012345678
Via: SIP/2.0/UDP 135.85.65.214:5062; branch=z9hG4bK-2
Record-Route: <sip:135.85.65.214:5061 ;lr>
Route: <sip:127.0.0.1;lr>
Max-Forwards: 69
CSeq: 1 INVITE
Call-ID: 7a66e93e@135.85.65.214
From: "UAC"<sip:UAC@135.85.65.214>;tag=363e5a34
To: "UAS"<sip:UAS@127.0.0.1:5060;transport=UDP>
Contact: "UAC"<sip:uac_a@127.0.0.1:5062; transport=UDP>
Subject: Performance test
Route: <sip:proxy@127.0.0.1:5061>
Content-Type: application/sdp
Content-Length: 101
v=0
o=-0 0 IN IP4 lucent.com
s=-
c=IN IP4 10.20.30.60
t=0 0
m=audio 5004 RTP/AVP 8 3 0

Although depicted as a parameter of a VIA header field, in one embodiment, a calculated routing digest may be implemented as a parameter (e.g., "lc" parameter or one or more other parameters of one or more other header fields). Although depicted as a parameter of a VIA header field, in one embodiment, a calculated routing digest may be implemented as a separate header field (i.e., using a routing digest header field rather than being included as a parameter of an existing header field such as the VIA header field). In one embodiment, in which a calculated routing digest is implemented as a separate header field, the separate header field may be inserted in the SIP message header immediately following the VIA header field associated with the SIP network element which computes the calculated routing digest.

At step 214, the PRD is determined. In one embodiment, the PRD is determined by parsing the header of the received SIP message. In one embodiment, the PRD is determined by identifying a routing digest header field name and identifying an associated routing digest header field value. In one embodiment, the PRD is determined by identifying a routing digest parameter name (e.g., a portion of a header field) and identifying an associated routing digest parameter value. In one embodiment, the PRD is determined as a portion of the processing performed for determining whether the received SIP message includes a PRD.

At step 216, the CRD and PRD are compared. The CRD and PRD are compared in order to determine whether a forwarding loop exists. At step 218, a determination is made as to whether a forwarding loop is detected. In one embodiment, a forwarding loop is detected if the CRD and PRD are identical (and a forwarding loop is not detected if the CRD and PRD are different). In one embodiment, a forwarding loop is detected if the CRD and PRD are substantially similar (e.g., if the difference between the CRD and the PRD falls within a threshold).

As depicted in FIG. 2, if a forwarding loop is not detected, method 200 proceeds to step 220, at which point the received message is forwarded. The received message is forward toward another SIP network element. From step 220, method 200 proceeds to step 226, where method 200 ends. If a forwarding loop is detected, method 200 proceeds to step 222. At step 222, a loop error is generated. At step 224, the loop error is generated toward at least one SIP network element. From step 224, method 200 proceeds to step 226, where method 200 ends.

Figure 3:
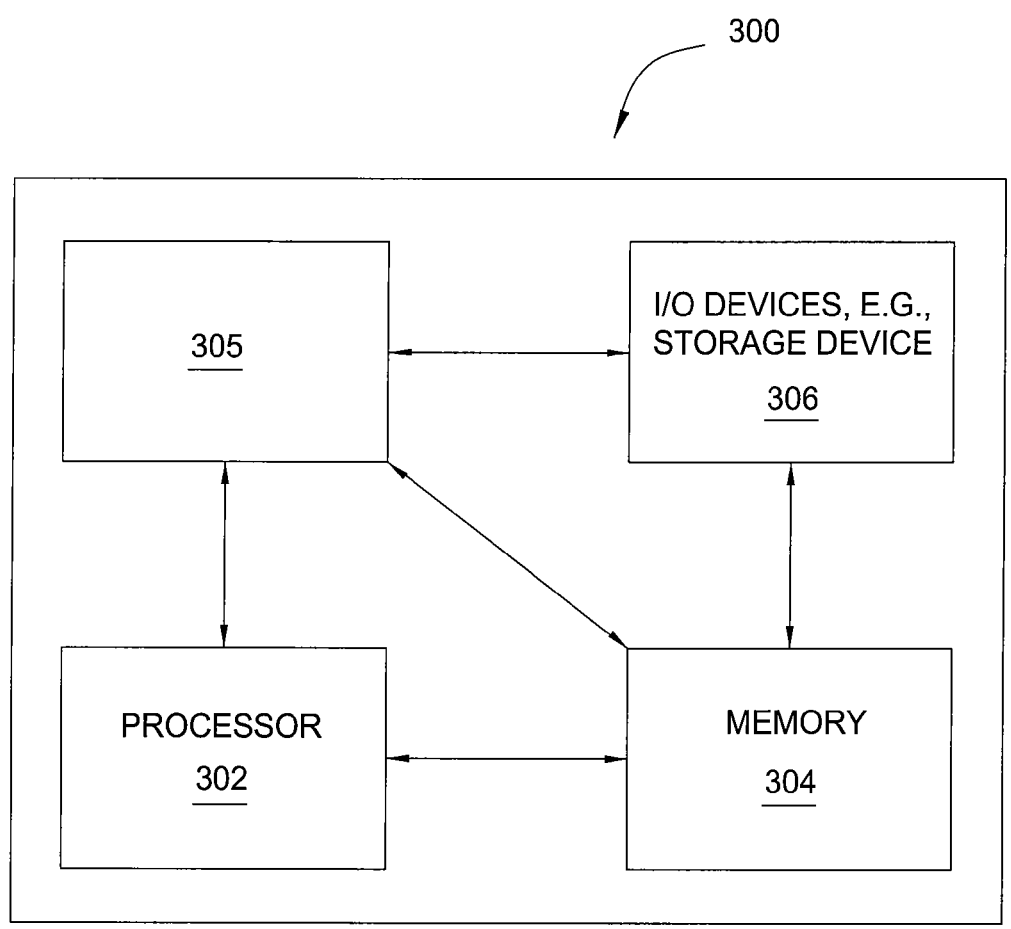
FIG. 3 depicts a high-level block diagram of a general-purpose computer suitable for use in performing at least a portion of the functions described herein.

FIG. 3 depicts a high-level block diagram of a general-purpose computer suitable for use in performing the functions described herein. As depicted in FIG. 3, system 300 comprises a processor element 302 (e.g., a CPU), a memory 304, e.g., random access memory (RAM) and/or read only memory (ROM), a loop detection module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present loop detection module or process 305 can be loaded into memory 304 and executed by processor 302 to implement the functions as discussed above. As such, loop detection process 305 (including associated data structures) of the present invention can be stored on a computer readable medium or carrier, e.g., RAM memory, magnetic or optical drive or diskette and the like.

In one embodiment, forwarding loop detection processing of the present invention may be implemented in a manner which prevents an impact to other message processing functions. In one embodiment, for example, a procedure call adapted for performing at least a portion of the forwarding loop detection processing functions of the present invention may be added to a code path in which each received message is processed. Although described with respect to specific implementations, forwarding loop detection processing of the present invention may be implemented using various other designs (e.g., configurations of components of network elements, other code path modifications, and the like, as well as various combinations thereof) which may or may not impact various other supported message processing functions.

In one embodiment, forwarding loop detection processing of the present invention may be configurable such that the forwarding loop detection processing functions of the present invention may be activated or deactivated (e.g., individually on a per-element basis, globally across multiple elements, and the like, as well as various combinations thereof). In one embodiment, forwarding loop detection processing of the present invention may be activated or deactivated automatically (e.g., each network element may activate and deactivate forwarding loop detection functions according to a predetermined schedule obtained by each network element (e.g., from an associated management system)). In one embodiment, forwarding loop detection processing of the present invention may be activated or deactivated manually (e.g., each network element may be manually configured in order to activate and deactivate forwarding loop detection functions).

In one embodiment, forwarding loop detection processing of the present invention may be configurable such that detection of a forwarding loop is performing using at least one forwarding loop detection criteria. In one embodiment, for example, forwarding loop detection processing of the present invention may only be performed in response to a determination that the number of a specific header in a message satisfies a threshold. In one such embodiment, for example, forwarding loop detection processing of the present invention may only be performed in response to a determination that the number of SIP VIA headers in a message satisfied a threshold. Although described with respect to a number of SIP VIA headers, various other criteria may be utilized for limiting application of the forwarding loop detection processing of the present invention.

Although primarily depicted and described herein with respect to a SIP-based network utilizing SIP messages, in various other embodiments, at least a portion of the functions of the present invention may be utilized for detecting forwarding loops in various other networks utilizing various other network elements, signaling protocols, message types, message formats, and the like, as well as various combinations thereof. The present invention is not intended to be limited to SIP-based networks utilizing SIP messages.

Although various embodiments which incorporate the teachings of the present invention have been shown and described in detail herein, those skilled in the art can readily devise many other varied embodiments that still incorporate these teachings.

What is claimed is:

1. A method for detecting a forwarding loop at a first network element, comprising:
   determining whether a received message was previously received by the first network element;
   when the received message was previously received by the first network element, calculating a current routing digest and determining whether a header of the received message includes a previous routing digest, further comprising:
      when the header of the received message includes the previous routing digest, determining whether a forwarding loop exists; and
      when the header of the received message does not include the previous routing digest, inserting the current routing digest into the header of the received message and forwarding the message toward the second network element; and when the received message was not previously received by the first network element, forwarding the received message toward a second network element.

2. The method of claim 1, wherein determining whether the received message was previously received by the first network element comprises:
 determining if a header of the received message includes a header field inserted by the first network element when the received message was previously received by the first network element.

3. The method of claim 1, wherein determining whether the forwarding loop exists comprises:
 comparing the current routing digest and the previous routing digest and performing one of:
 when the current routing digest and the previous routing digest match, detecting the forwarding loop; and
 when the current routing digest and previous routing digest do not match, forwarding the message toward the second network element.

4. The method of claim 1, wherein calculating the current routing digest comprises:
 identifying, in the header of the received message, selected ones of a plurality of header fields associated with routing of the received message; and
 calculating the current routing digest using the selected ones of the header fields associated with routing of the received message.

5. The method of claim 4, wherein calculating the current routing digest using the selected ones of the header fields associated with routing of the received message comprises:
 summing a result of a hash function over the selected ones of the header fields.

6. The method of claim 1, wherein the current routing digest is inserted into the received message as a portion of the header of the received message.

7. The method of claim 1, wherein the current routing digest is inserted into the received message as a portion of a header field of the header of the received message, wherein the current routing digest comprises a routing digest parameter name and a routing digest parameter value.

8. An apparatus for detecting a forwarding loop at a first network element, comprising:
 a processor; and
 a memory storing instructions, which when executed by the processor, causes the processor to:
 determine whether a received message was previously received by the first network element;
 when the received message was previously received by the first network element, calculate a current routing digest, determine whether a header of the received message includes a previous routing digest, and perform one of:
 when the header of the received message includes the previous routing digest, determine whether a forwarding loop exists; and
 when the header of the received message does not include the previous routing digest, insert the current routing digest into the header of the received message and forward the message toward the second network element; and
 when the received message was not previously received by the first network element, forward the received message toward a second network element.

9. The apparatus of claim 8, wherein the processor is configured to determine whether the received message was previously received by the first network element by determining if a header of the received message includes a header field inserted by the first network element when the received message was previously received by the first network element.

10. The apparatus of claim 8, wherein the processor is configured to determine whether the forwarding loop exists comprises by:
 comparing the current routing digest and the previous routing digest, wherein:
 when the current routing digest and the previous routing digest match, detecting the forwarding loop; and
 when the current routing digest and previous routing digest do not match, forwarding the message toward the second network element.

11. The apparatus of claim 8, wherein the processor is configured to calculate the current routing digest by:
 identifying, in the header of the received message, selected ones of a plurality of header fields associated with routing of the received message; and
 calculating the current routing digest using the selected ones of the header fields associated with routing of the received message.

12. The apparatus of claim 11, wherein calculating the current routing digest using the selected ones of the header fields associated with routing of the received message comprises:
 summing a result of a hash function over the selected ones of the header fields.

13. The apparatus of claim 8, wherein the current routing digest is inserted into the received message as a portion of the header of the received message.

14. The apparatus of claim 8, wherein the current routing digest is inserted into the received message as a portion of a header field of the header of the received message, wherein the current routing digest comprises a routing digest parameter name and a routing digest parameter value.

15. A non-transitory computer readable storage medium storing a software program, that, when executed by a computer, causes the computer to perform a method for detecting a forwarding loop at a first network element, the method comprising:
 determining whether a received message was previously received by the first network element;
 when the received message was previously received by the first network element, calculating a current routing digest and determining whether a header of the received message includes a previous routing digest, further comprising:
 when the header of the received message includes the previous routing digest, determining whether a forwarding loop exists; and
 when the header of the received message does not include the previous routing digest, inserting the current routing digest into the header of the received message and forwarding the message toward the second network element; and
 when the received message was not previously received by the first network element, forwarding the received message toward a second network element.

16. The non-transitory computer readable storage medium of claim 15, wherein determining whether the received message was previously received by the first network element comprises:
 determining if a header of the received message includes a header field inserted by the first network element when the received message was previously received by the first network element.

17. The non-transitory computer readable storage medium of claim 15, wherein determining whether the forwarding loop exists comprises:
- comparing the current routing digest and the previous routing digest and performing one of:
- when the current routing digest and the previous routing digest match, detecting the forwarding loop; and
- when the current routing digest and previous routing digest do not match, forwarding the message toward the second network element.

18. The non-transitory computer readable storage medium of claim 15, wherein calculating the current routing digest comprises:
- identifying, in the header of the received message, selected ones of a plurality of header fields associated with routing of the received message; and
- calculating the current routing digest using the selected ones of the header fields associated with routing of the received message.

19. The non-transitory computer readable storage medium of claim 18, wherein calculating the current routing digest using the selected ones of the header fields associated with routing of the received message comprises:
- summing a result of a hash function over the selected ones of the header fields.

20. The non-transitory computer readable storage medium of claim 15, wherein the current routing digest is inserted into the received message as a portion of the header of the received message.

* * * * *